United States Patent
Arai

(10) Patent No.: US 12,136,813 B2
(45) Date of Patent: Nov. 5, 2024

(54) UNDERSEA DEVICE, ENERGIZATION METHOD, AND RECORDING MEDIUM

(71) Applicant: NEC Corporation, Tokyo (JP)

(72) Inventor: Narihiro Arai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 113 days.

(21) Appl. No.: 17/783,108

(22) PCT Filed: Nov. 19, 2020

(86) PCT No.: PCT/JP2020/043258
§ 371 (c)(1),
(2) Date: Jun. 7, 2022

(87) PCT Pub. No.: WO2021/124789
PCT Pub. Date: Jun. 24, 2021

(65) Prior Publication Data
US 2022/0416538 A1    Dec. 29, 2022

(30) Foreign Application Priority Data
Dec. 20, 2019    (JP) .................................. 2019-230364

(51) Int. Cl.
*H02J 1/10*    (2006.01)
(52) U.S. Cl.
CPC ...................... *H02J 1/10* (2013.01)
(58) Field of Classification Search
CPC ..... G01B 21/32; G01B 5/30; H01M 10/4285; H01M 10/48; H01M 10/42; H01M 10/052; H01M 50/209; H01M 50/242
See application file for complete search history.

(56) References Cited

U.S. PATENT DOCUMENTS

2009/0028566 A1    1/2009    Abbott
2018/0212425 A1*   7/2018    Arai .................. H04B 3/44

FOREIGN PATENT DOCUMENTS

| CN | 101836378 A | 9/2010 |
|---|---|---|
| CN | 102891594 A | 1/2013 |
| CN | 102934377 A | 2/2013 |
| JP | 2001-230707 A | 8/2001 |
| KR | 100967211 B1 | 7/2010 |
| WO | 2013/094266 A1 | 6/2013 |
| WO | 2017/159648 A1 | 9/2017 |
| WO | 2019/171053 A1 | 9/2019 |

OTHER PUBLICATIONS

International Search Report for PCT Application No. PCT/JP2020/043258, mailed on Feb. 22, 2021.

(Continued)

*Primary Examiner* — Jeffrey M Shin
(74) *Attorney, Agent, or Firm* — Sughrue Mion, PLLC

(57) ABSTRACT

In order to reduce the occurrence of component failure, this undersea device is provided with one or more temporarily energized units which are temporarily energized during use, and an energization switching unit which, when a predetermined operation is performed, supplies power to at least one temporarily energized unit, and which, upon completion of the operation, terminates supply of power to the at least one temporarily energized unit.

13 Claims, 9 Drawing Sheets

(56) References Cited

OTHER PUBLICATIONS

English translation of Written opinion for PCT Application No. PCT/JP2020/043258, mailed on Feb. 22, 2021.
Extended European Search Report for EP Application No. 20902357.1, dated on Dec. 13, 2023.
CN Office Action for CN Application No. 202080086947.2, mailed on Sep. 21, 2023 with English Translation.

* cited by examiner

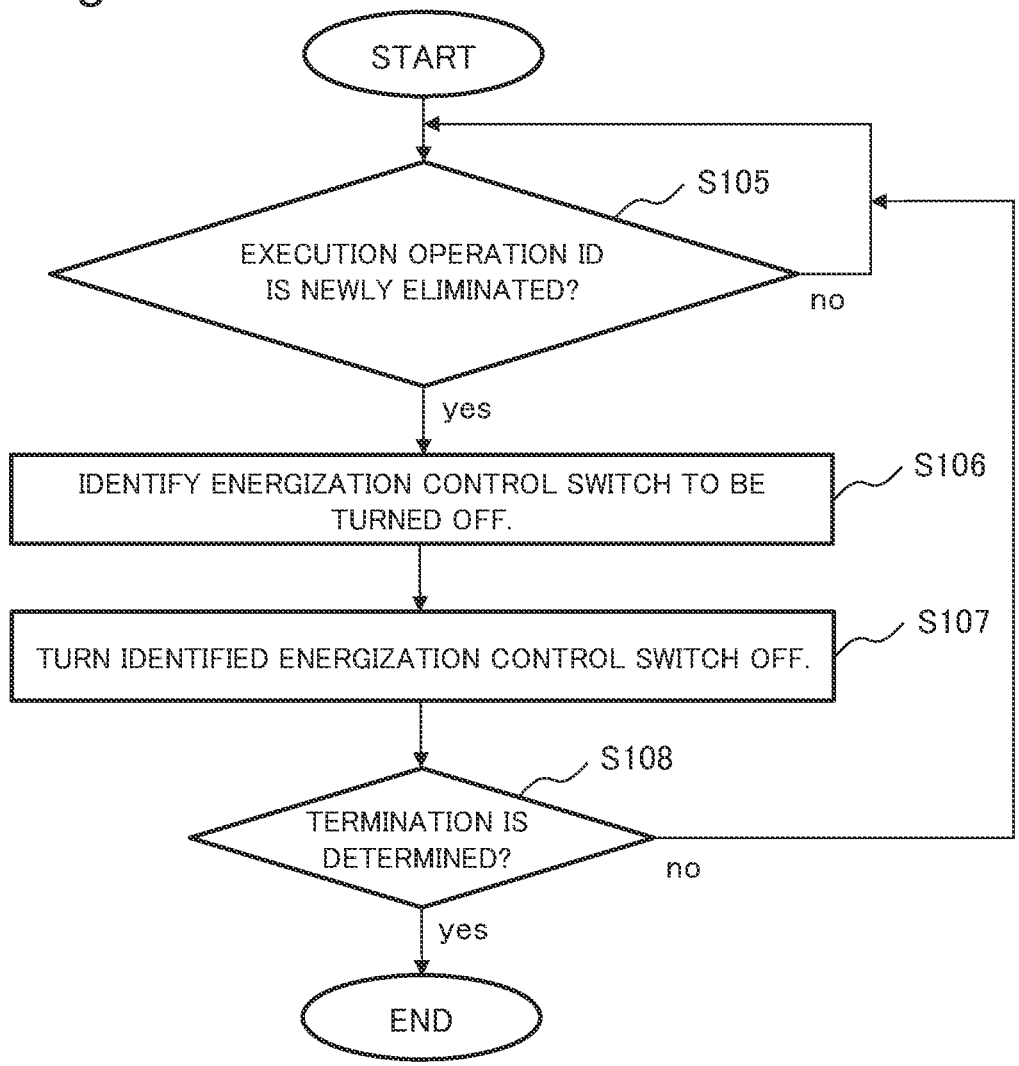

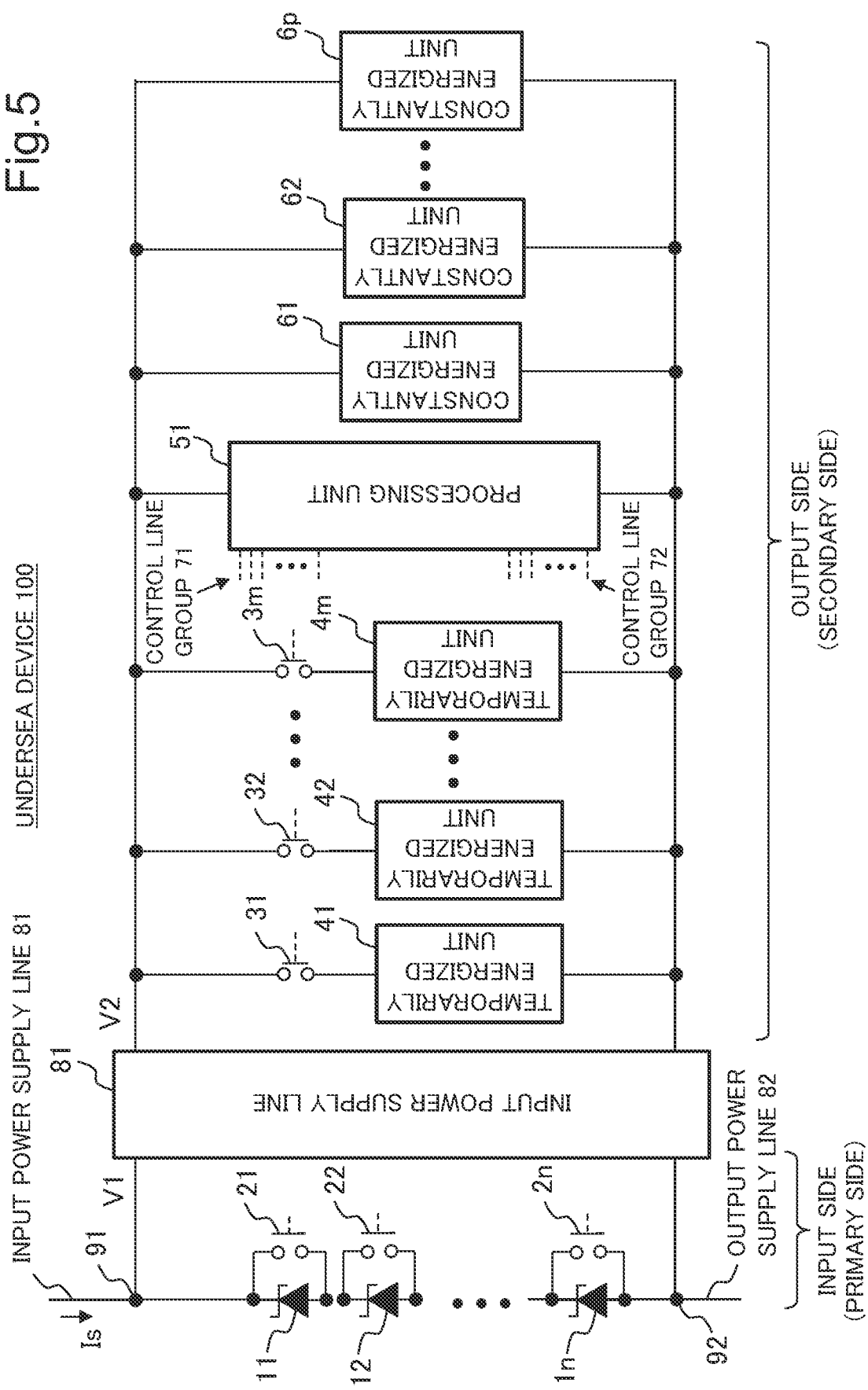

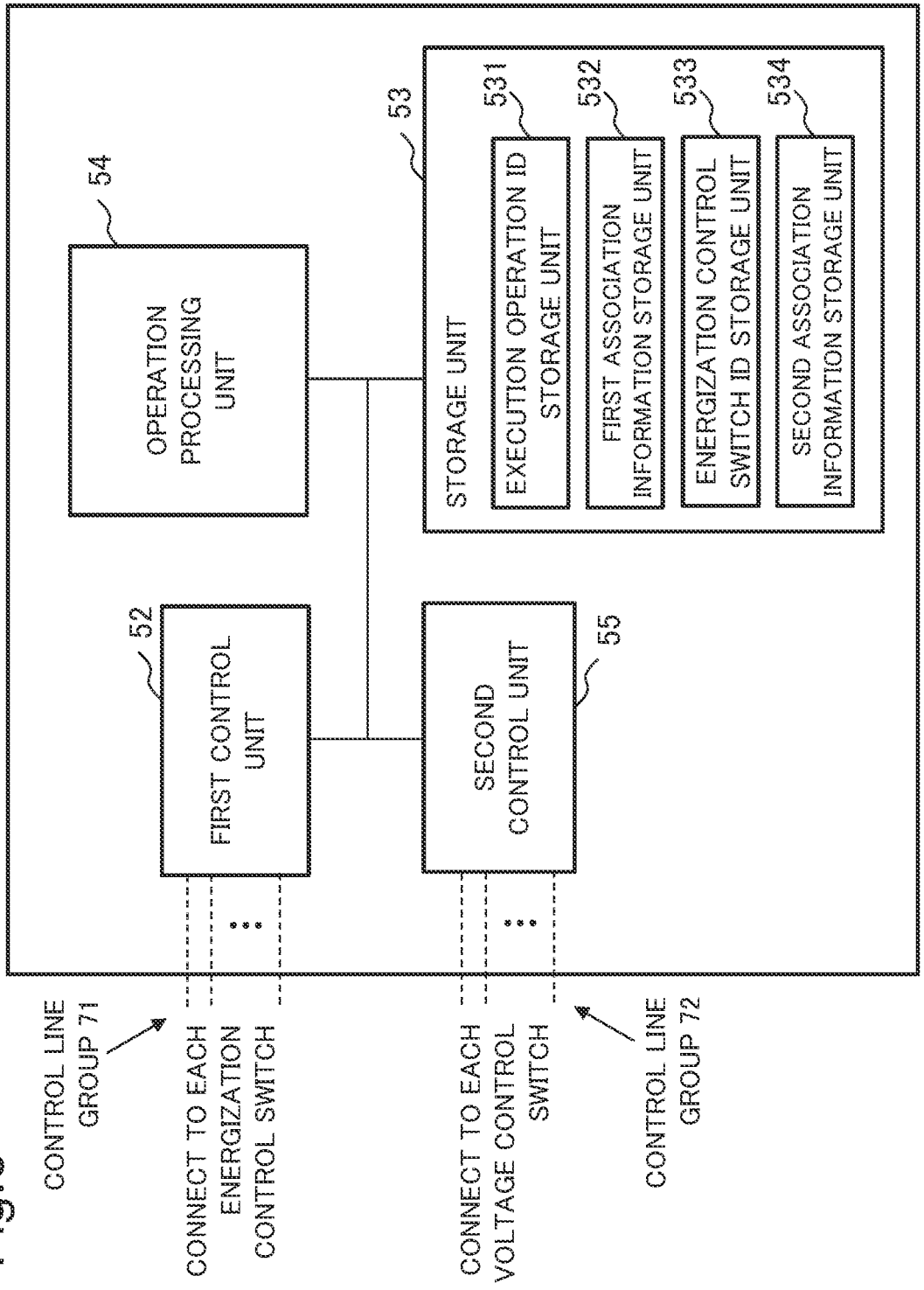

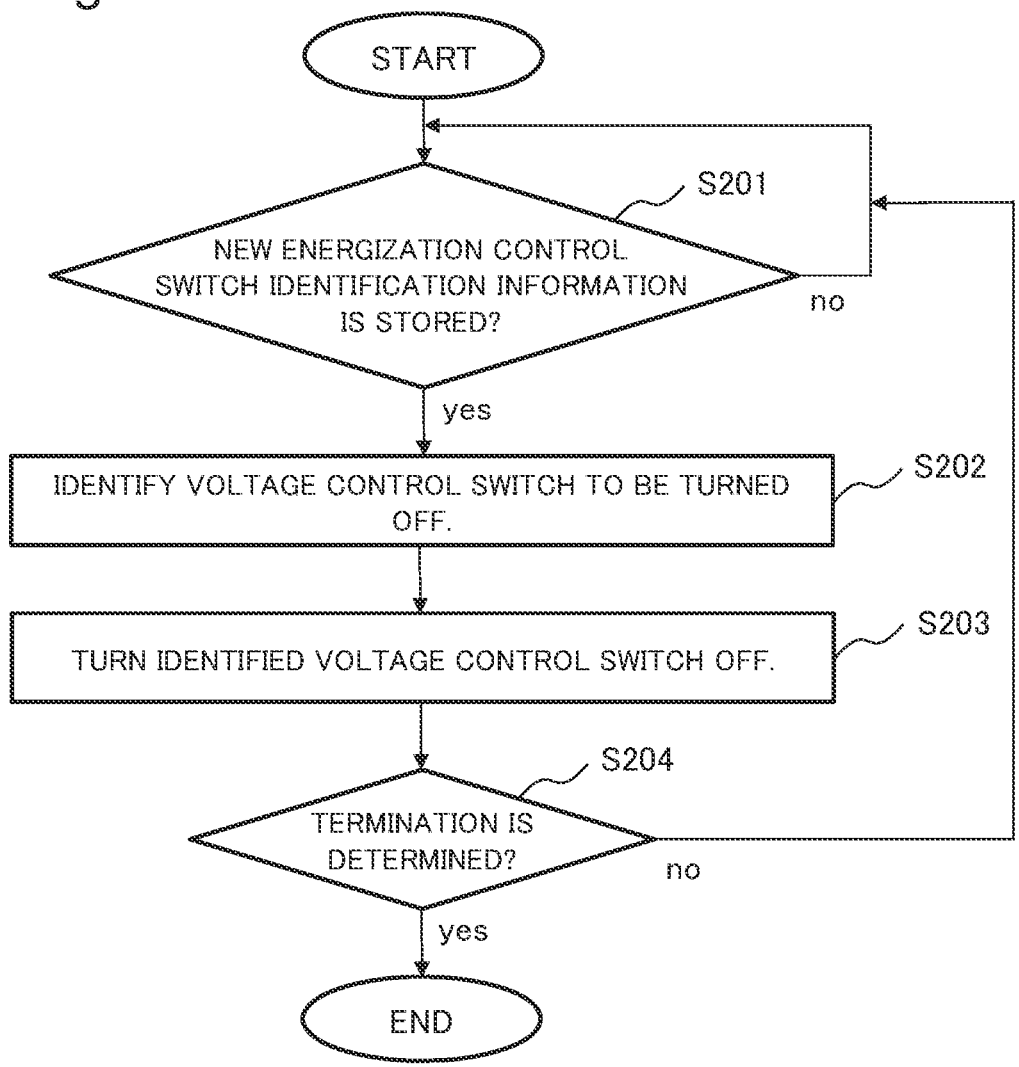

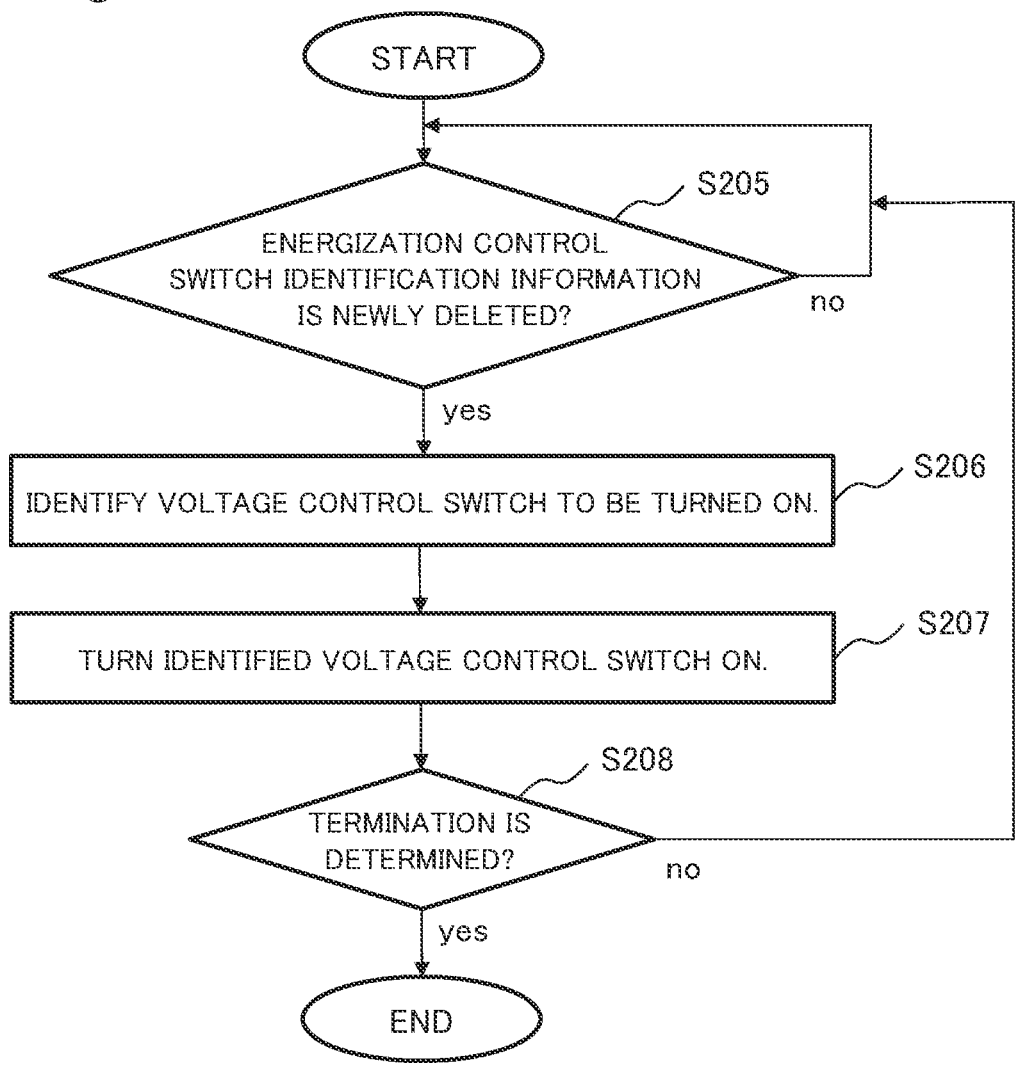

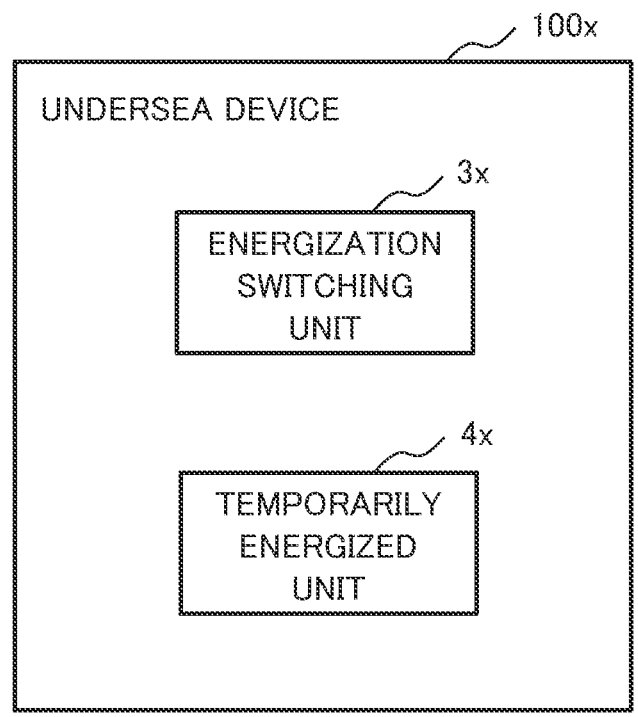

UNDERSEA DEVICE, ENERGIZATION METHOD, AND RECORDING MEDIUM

This application is a National Stage Entry of PCT/JP2020/043258 filed on Nov. 19, 2020, which claims priority from Japanese Patent Application 2019-230364 filed on Dec. 20, 2019, the contents of all of which are incorporated herein by reference, in their entirety.

TECHNICAL FIELD

The present invention relates to an undersea cable system.

BACKGROUND ART

An undersea cable system is a communication system that includes a land-side device present on land and an undersea device installed on a seabed, and is provided with a cable having a total length of 10,000 km or longer in some cases. The undersea cable system has a function as a basic infrastructure for connecting a nation to another nation. Thus, the undersea cable system requires high reliability that enables continuous operation approximately for a quarter of a century without a defect.

In the undersea cable system, a recent demand for high functionality requires adoption of a component to be used in a land communication device in which a new highly-functional component is readily adopted. However, most of such components do not necessarily have high reliability required for the undersea device. Thus, when such components are used in the undersea device, an initial failure is first eliminated by performing additional screening. In addition, in consideration of derating, a circuit is designed in such a way as to prevent a component from operating for a long period of time under an overloaded state, or a redundant circuit is designed on an assumption of occurrence of a component defect.

Herein, PTL 1 discloses an undersea device that controls the current in such a way that the current flows to or is prevented from flowing to a drive voltage generation means each prepared according to a load, in accordance with a detection result indicating whether each load is connected to the undersea device.

CITATION LIST

Patent Literature

[PTL 1] International Patent Publication No. WO2017/159648

SUMMARY OF INVENTION

Technical Problem

However, even when an initial failure is eliminated as described in the section of Background Art, accidental occurrence of a defect cannot be suppressed. Circuit designing described in the section of Background Art causes much cost and limitations on designing.

The undersea device disclosed in PTL 1 does not reduce an operating time of a load because, when the load is connected to the undersea device, current always flows to the load. Thus, the undersea device cannot prevent a defect of the load for a long period of time by reducing the operating time of the load.

An object of the present invention is to provide an undersea device and the like that can suppress occurrence of a component defect.

Solution to Problem

An undersea device according to the present invention is used in an undersea cable system, and includes one or more temporarily energized units being a temporarily energized portion during use, and an energization switching unit that supplies power to at least one of the temporarily energized units when a predetermined operation is executed and that terminates power supply to at least one of the temporarily energized units when the operation is completed.

Advantageous Effects of Invention

The undersea device and the like according to the present invention are able to suppress occurrence of a component defect.

BRIEF DESCRIPTION OF DRAWINGS

FIG. 4 is a conceptual diagram illustrating a processing flow example of processing of turning off the energization control switch.

FIG. 5 is a conceptual diagram illustrating a configuration example of an undersea device according to a second example embodiment.

FIG. 6 is a conceptual diagram illustrating a configuration example of a processing unit according to the second example embodiment.

FIG. 7 is a conceptual diagram illustrating a processing flow example of processing of turning off a voltage control switch, which is executed by a second control unit.

FIG. 8 is a conceptual diagram illustrating a processing flow example of processing of turning on the voltage control switch, which is executed by the second control unit.

FIG. 9 is a conceptual diagram illustrating a minimum configuration of the undersea device according to the example embodiments.

EXAMPLE EMBODIMENT

First Example Embodiment

A first example embodiment is an example embodiment relating to an undersea device including a component that performs energization when an operation having a predetermined function is executed and stops energization otherwise, and the like.

[Configuration and Operation]

Figure 1:
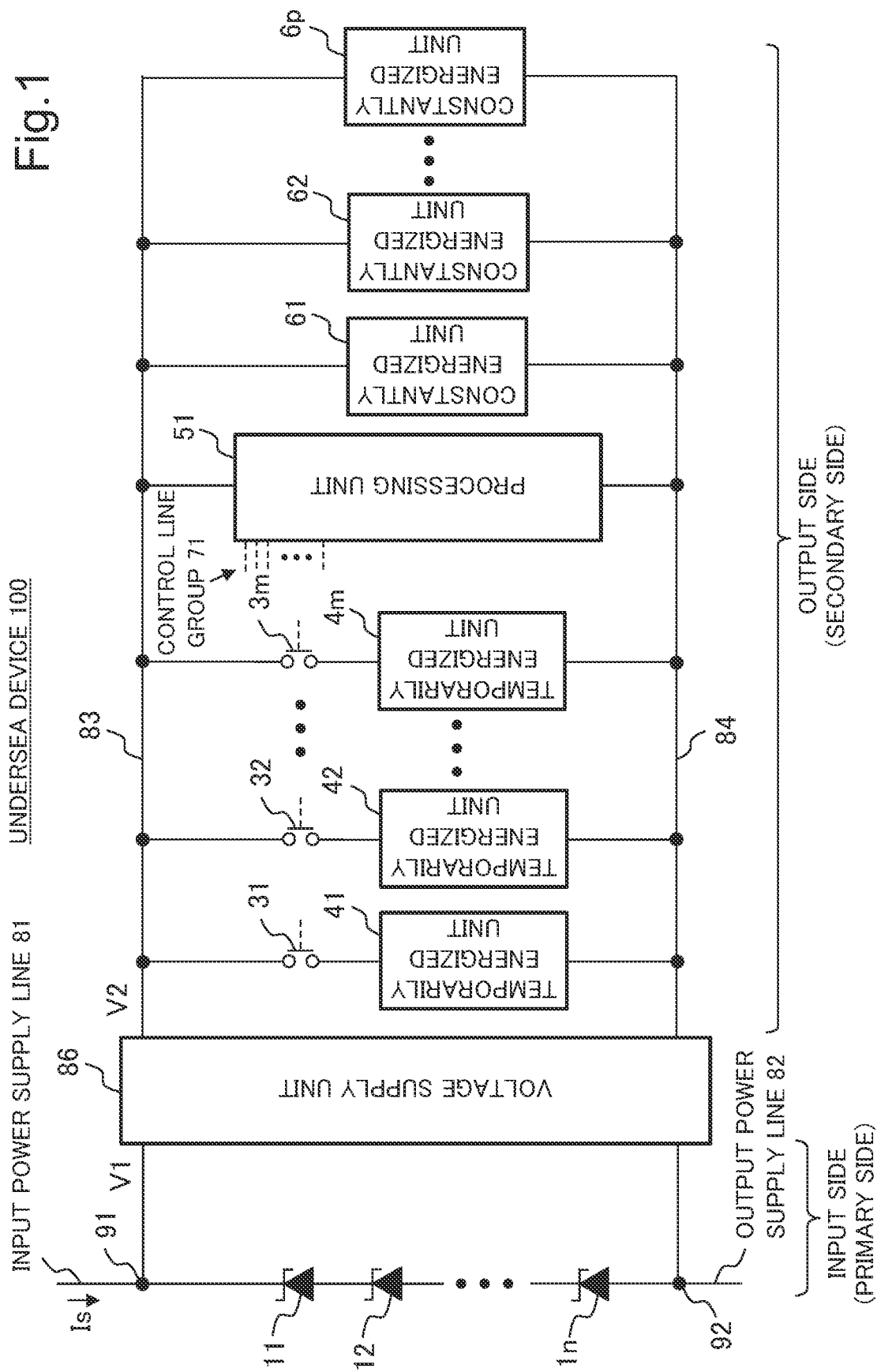
FIG. 1 is a conceptual diagram illustrating a configuration example of an undersea device according to a first example embodiment.

FIG. 1 is a conceptual diagram illustrating a configuration of an undersea device 100 being an example of the undersea device according to the first example embodiment. FIG. 1 only illustrates a configuration of the undersea device 100 that relates to energization. In addition to the configuration illustrated in FIG. 1, the undersea device 100 includes an optical component, a casing, a mold, and a configuration relating to a mechanism.

The undersea device 100 is typically an amplification relay device that is connected to an undersea cable and amplifies and relays an optical signal propagating through an optical fiber in the undersea cable.

The undersea device 100 includes Zener diodes 11 to 1$n$ being n Zener diodes, a voltage supply unit 86, energization control switches 31 to 3$m$ being m energization control switches, and temporarily energized units 41 to 4$m$ being m temporarily energized units. Herein, the energization control switch is a switch that performs switching between an on state and an off state of power supply to the temporarily energized unit. The undersea device 100 further includes a processing unit 51, and constantly energized units 61 to 6$p$ being p constantly energized units.

The Zener diodes 11 to 1$n$ are inserted between an input power supply line 81 and an output power supply line 82 while being connected in series in a direction opposite to a direction of a system current Is. Herein, the input power supply line 81 is a power supply line that is connected to a land device directly or indirectly via another device and supplies power to the undersea device 100. Meanwhile, the output power supply line 82 is a power supply line that supplies power from the undersea device 100 to another undersea device or the like. The system current Is is a current flowing from the input power supply line 81 to the output power supply line 82.

The Zener diodes 11 to 1$n$ set a primary voltage V1, which is a voltage between a terminal 91 and a terminal 92, to a sum voltage of breakdown voltages of the Zener diodes. The primary voltage V1 is an input voltage that is supplied to the voltage supply unit 86. Values of the breakdown voltages of the Zener diodes are not necessarily needed to be equal to one another. When the values of the breakdown voltages of the Zener diodes are equal to one another, the sum voltage is equal to n times of a breakdown voltage of one Zener diode.

The voltage supply unit 86 supplies a secondary voltage V2, which is generated from the primary voltage V1, between a wiring line 83 and a wiring line 84. For example, the voltage supply unit 86 is a DC/DC converter that generates, from one DC voltage, another DC voltage. Herein, DC is an abbreviation of direct current. The voltage supply unit 86 may generate and output a voltage having a value equal to that of the input voltage.

Each of the temporarily energized units 41 to 4$m$ is a portion to which power is supplied only when an operation having a predetermined function is executed. The temporarily energized units 41 to 41$m$ are connected to the energization control switches 31 to 3$m$ in series, respectively. Each of the series-connections is connected to the wiring line 83 and the wiring line 84. The wiring line 83 and the wiring line 84 may simply be conductors instead of lines.

Each of the energization control switches 31 to 3$m$ are connected to each control line in a control line group 71 of the processing unit 51. Each of the energization control switches 31 to 3$m$ establishes an on state in which one terminal and the other terminal are short-circuited, or establishes an off state in which one terminal and the other terminal are insulated from each other, based on an energization control signal, which is input through the control line. For example, each of the energization control switches is a field effect transistor.

When the undersea device 100 executes the operation having the predetermined function, the processing unit 51 selects one of the energization control switches, and turns the selected energization control switch on. A plurality of the energization control switches may be turned on at one time. When terminating the operation having the predetermined function executed by energizing the temporarily energized unit, the processing unit turns off the energization control switch that energizes the temporarily energized unit. In this manner, with regard to the operation having the predetermined function, power supply to the temporarily energized unit that is used for the operation is performed only while the processing unit 51 turns the energization control switch on.

Each of the constantly energized units 61 to 6$p$ is a portion that is constantly energized regardless of operations executed by the undersea device 100. Each of the constantly energized units 61 to 6$p$ are connected to the wiring line 83 and 84 without being intermediated by an energization control switch. With this, each of the constantly energized units 61 to 6$p$ is constantly energized regardless of the operations executed by the undersea device 100.

For example, a component or a component group that is energized when the undersea device executes an operation having a function of responding to remote control from a land device to the undersea device is assumed as the temporarily energized unit. In order for the undersea device to respond to remote control from the land device, it is assumed that the undersea device includes a laser module, modulates the laser module, and responds to the land device with an optical signal. Normally, such remote control is not frequently executed in a daily basis, and such a laser module in general is not a reliable component guaranteed to withstand a long-term operation. Thus, in view of life prolongation of the component, energization only during use is desirable. Therefore, it is suitable that the laser module or the like that executes the operation having the function be set as the temporarily energized unit.

In contrast, an electric component or the like used for amplifying and relaying an optical signal is constantly used, and hence is suitably set as the constantly energized unit.

Figure 2:
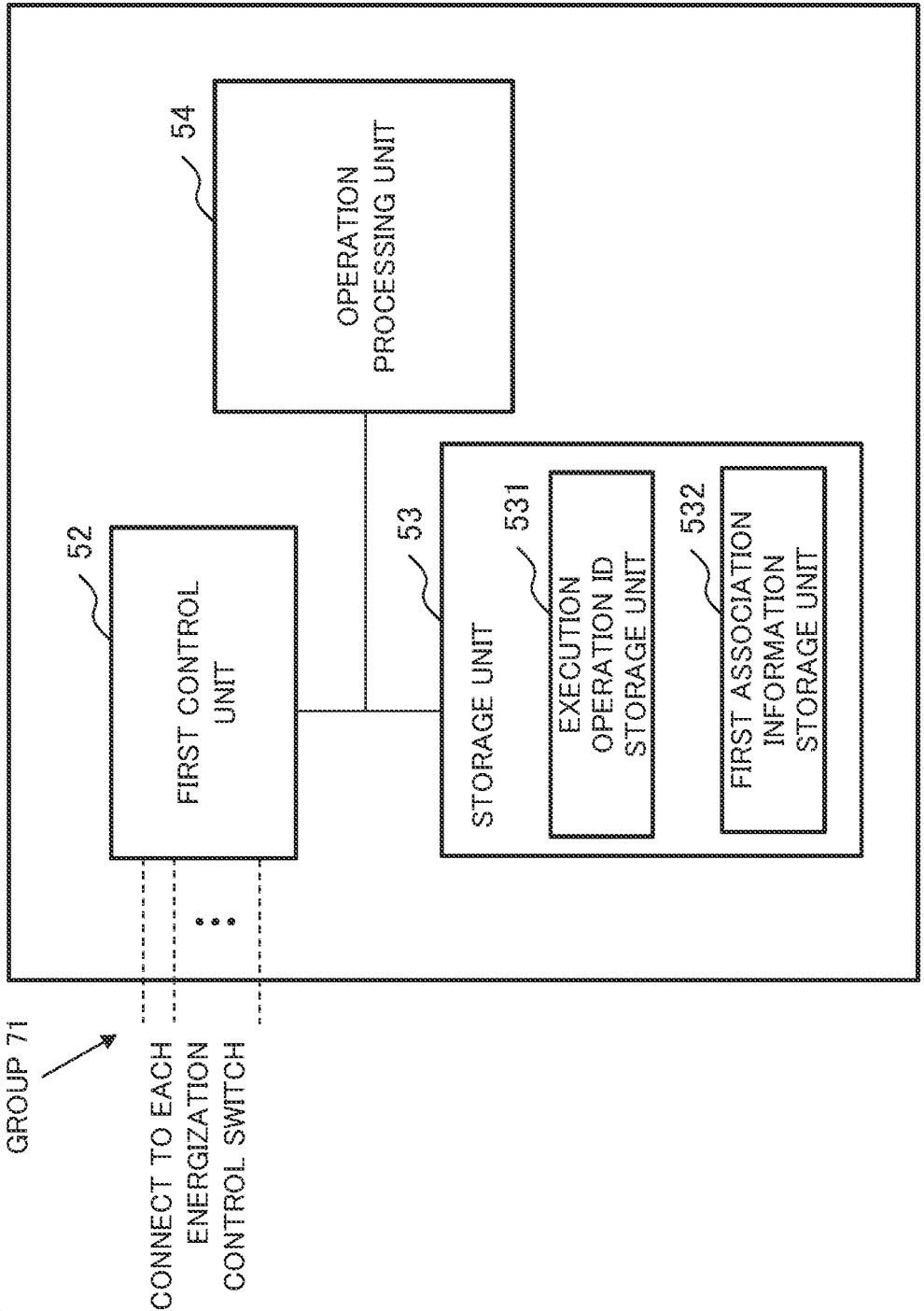
FIG. 2 is a conceptual diagram illustrating a configuration example of a processing unit according to the first example embodiment.

FIG. 2 is a conceptual diagram illustrating a configuration example of the processing unit 51 illustrated in FIG. 1. The processing unit 51 includes a first control unit 52, a storage unit 53, and an operation processing unit 54.

The operation processing unit 54 executes processing relating to the operations executed by the undersea device 100 in FIG. 1. When the undersea device 100 is a relay device, the operations include an operation related to amplification and relay of an optical signal.

The operation processing unit 54 executes operations (specific functional operations) relating to some predetermined functions in some cases. The specific functional operation is an operation that is set in advance as an operation using the temporarily energized unit. For example, the operation is to respond to a communication from the above-mentioned land device. Information for identifying the specific functional operation is stored in the storage unit 53.

When executing the specific functional operation, the operation processing unit 54 antecedently stores, in an execution operation ID storage unit 531 of the storage unit 53, an execution operation ID indicating which specific functional operation is to be executed subsequently. Herein, ID is an abbreviation of identifier, and indicates identification information.

When the specific functional operation to be executed is completed, the operation processing unit 54 deletes the stored execution operation ID from the execution operation ID storage unit 531.

The first control unit 52 monitors information stored in the above-mentioned execution operation ID storage unit 531. Then, it is assumed that the first control unit 52 determines that a new execution operation ID is stored in the execution operation ID storage unit 531. In this case, the first control unit 52 identifies an energization control switch ID being information for identifying an energization control switch to be turned on in order to energize a temporarily energized unit to be used for executing the specific functional operation indicated by the execution operation ID. Herein, it is assumed that first association information is stored in a first association information storage unit 532 of the storage unit 53, the first association information being information associating the execution operation ID with the energization control switch ID of the energization control switch to be turned on at a time of executing the specific functional operation indicated by the execution operation ID. During the identification, the first control unit 52 excludes, from specification targets, an energization control switch associated with an execution operation ID that has been already stored when the new execution operation ID is stored. Then, the first control unit 52 switches the identified energization control switch from an off state to an on state.

Meanwhile, it is assumed that the first control unit 52 determines that the stored execution operation ID is deleted from the execution operation ID storage unit 531. In this case, the first control unit 52 identifies an energization control switch ID of an energization control switch to be turned off in order to cancel energization to a temporarily energized unit used for executing the specific functional operation indicated by the execution operation ID.

Subsequently, the first control unit 52 excludes, from the identified energization control switch IDs, an energization control switch ID that is turned on in order to execute an operation indicated by another execution operation ID stored in the execution operation ID storage unit 531. Then, the first control unit 52 turns off the energization control switch indicated by the energization control switch ID after elimination.

The storage unit 53 antecedently stores a program and information that are used for operations executed by the operation processing unit 54 and the first control unit 52. The storage unit 53 stores information instructed by the operation processing unit 54 and the first control unit 52. The storage unit 53 transmits the information instructed by the operation processing unit 54 and the first control unit 52 to a transmission destination being any one of the operation processing unit 54 and the first control unit 52.

The storage unit 53 stores and retains the above-mentioned execution operation ID in the execution operation ID storage unit 531. The storage unit 53 retains the above-mentioned first association information in the first association information storage unit 532. The storage unit 53 retains other information and programs in another part of the storage unit 53.

For example, the processing unit 51 is a computer or a processor. In this case, the processing unit 51 may be executed based on a program stored in the storage unit 53.

Figure 3:
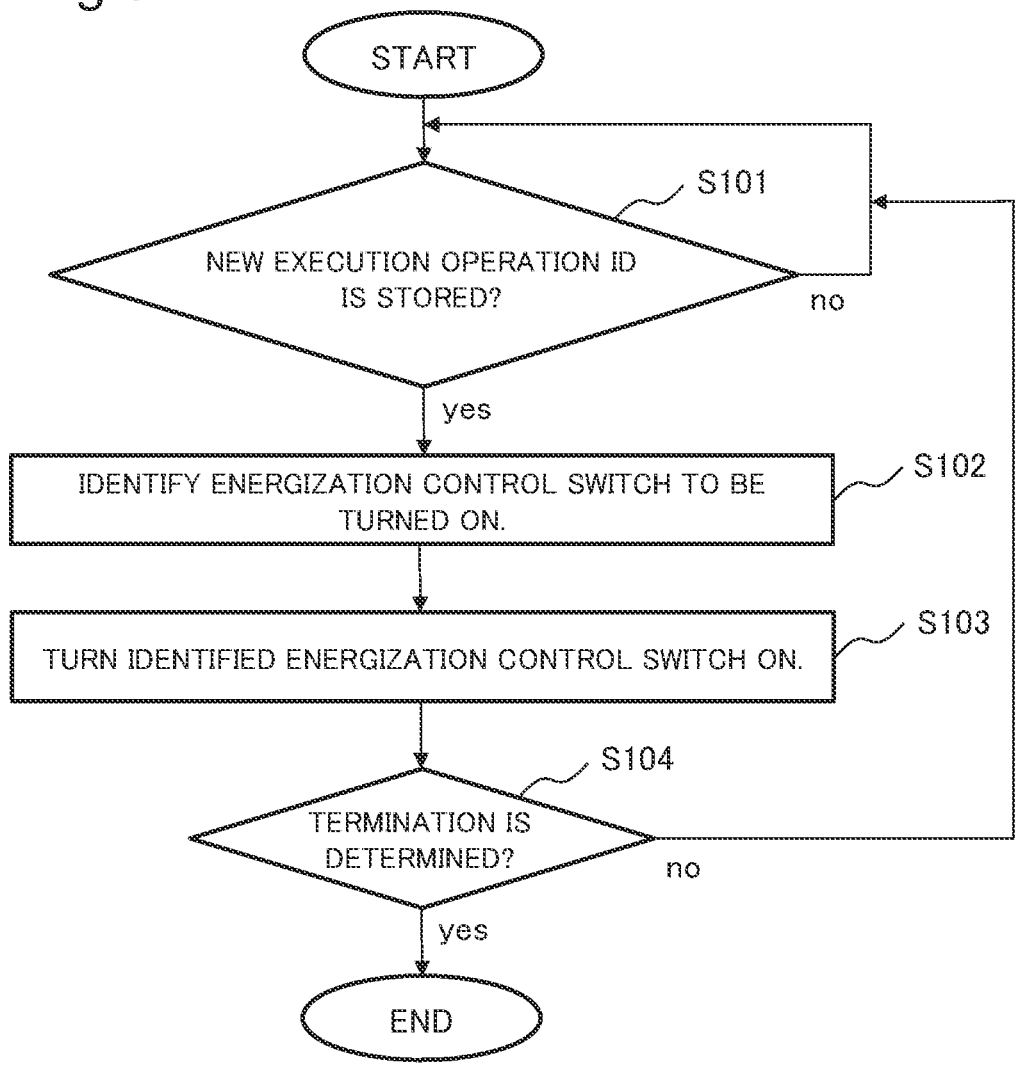
FIG. 3 is a conceptual diagram illustrating a processing flow example of processing of turning on an energization control switch.

FIG. 3 is a conceptual diagram illustrating a processing flow example of processing of turning an energization control switch on, which executed by the first control unit 52 illustrated in FIG. 2. For example, the first control unit 52 starts the processing illustrated in FIG. 3 when activation of the processing unit 51 is completed.

First, as processing in Step S101, the first control unit 52 determines whether a new execution operation ID is stored in the execution operation ID storage unit 531 in FIG. 2.

When a determination result acquired in the processing in Step S101 is yes, the first control unit 52 executes processing in Step S102. Meanwhile, when the determination result acquired in the processing in Step S101 is no, the first control unit 52 repeats the processing in Step S101, and waits for a new execution operation ID to be stored in the execution operation ID storage unit 531.

When executing the processing in Step S102, the first control unit 52 identifies, as the processing in Step S102, an energization control switch ID of the energization control switch to be turned on. When executing this specification, the first control unit 52 first executes first identification described below. Specifically, the first identification identifies, based on the first association information stored in the first association information storage unit 532, an energization control switch ID of an energization control switch associated with the execution operation ID that has been determined by the processing in Step S101 to be newly stored.

For example, it is assumed that the execution operation ID that is newly stored is an ID indicating a reply operation for information transmitted from the land device. Further, it is assumed that temporarily energized units required for the reply operation are the temporarily energized unit 41 being a transmission laser module and the temporarily energized unit 42 being a control circuit of the laser module. Moreover, it is assumed that, in the first association information, the execution operation ID is associated with the energization control switch IDs of the energization control switch 31 connected to the temporarily energized unit 41 in series and the energization control switch 32 connected to the temporarily energized unit 42 in series. In this case, the first control unit 52 executes the first identification of identifying the energization control switches 31 and 32.

Subsequently, the first control unit 52 executes second identification for identifying, based on the first association information, an energization control switch ID that is associated with an execution operation ID antecedently stored in the execution operation ID storage unit.

For example, it is assumed that the execution operation IDs antecedently stored include an execution operation relating to measurement of a temperature through use of a temperature sensor. Further, it is assumed that the temporarily energized unit 42 being a control circuit is used for the execution operation. Moreover, it is assumed that, in the first association information, the energization control switch 32 is associated with the execution operation ID for measuring a temperature. In this case, the first control unit 52 executes the second identification of identifying the energization control switch 32.

Then, the first control unit 52 eliminates, from the energization control switch IDs identified in the first identification, an energization control switch ID that is shared in common by both the energization control switch IDs identified in the first identification and the energization control switch ID identified in the second identification, and identifies an energization control switch ID after the elimination as an energization control switch identified in Step S102.

In the above-mentioned example, the elimination of an overlapping item is to eliminate the energization control switch ID of the energization control switch 32 identified in the second identification, from the energization control switch IDs of the energization control switches 31 and 32 identified in the first identification. The energization control switch ID of the energization control switch 31 is the energization control switch ID identified in the processing in Step S102.

Then, in processing of Step S103, the first control unit 52 turns on the energization control switch that is indicated by the energization control switch ID identified in the processing in Step S102.

Subsequently, in processing of Step S104, the first control unit 52 determines whether to terminate the processing in FIG. 3. The first control unit 52 executes the determination by determining whether termination information is input from the outside, for example.

In parallel with the processing illustrated in FIG. 3, the first control unit 52 executes processing illustrated in FIG. 4. FIG. 4 is a conceptual diagram illustrating a processing flow example of processing of turning the energization control switch off, which is executed by the first control unit 52 illustrated in FIG. 2. For example, when activation of the processing unit 51 is completed, the first control unit 52 starts the processing illustrated in FIG. 4.

First, as processing in Step S105, the first control unit 52 determines whether an execution operation ID is newly deleted from the execution operation ID storage unit 531.

When a determination result acquired in the processing in Step S105 is yes, the first control unit 52 executes processing in Step S106. Meanwhile, when the determination result acquired in the processing in Step S105 is no, the first control unit 52 repeats the processing in Step S105.

When executing the processing in Step S106, the first control unit 52 identifies, as the processing in Step S106 an energization control switch ID of the energization control switch to be turned off. When executing this identification, the first control unit 52 first executes third specification described below. Specifically, the third identification identifies, based on the first association information stored in the first association information storage unit 532, an energization control switch ID of an energization control switch to be turned off associated with the execution operation ID that is determined in the processing in Step S105 to be newly deleted.

For example, it is assumed that the execution operation ID that is determined in the processing in Step S105 to be newly eliminated is the above-mentioned ID of the reply operation to the information transmitted from the land device. Further, it is assumed that temporarily energized units required for the reply operation are the temporarily energized unit 41 being a transmission laser module and the temporarily energized unit 42 being a control circuit of the laser module. Moreover, it is assumed that, in the first association information, the execution operation ID is associated with the energization control switch IDs of the energization control switch 31 connected to the temporarily energized unit 41 in series and the energization control switch 32 connected to the temporarily energized unit 42 in series. In this case, the first control unit 52 executers the third identification of identifying the energization control switches 31 and 32.

Subsequently, fourth identification is executed for identifying, based on the first association information, an energization control switch ID to be maintained in an on state that is associated with an execution operation ID still stored in the execution operation ID storage unit 531.

For example, the fourth identification is executed in the following manner. For example, it is assumed that the execution operation IDs still stored in the execution operation ID storage unit 531 include an execution operation relating to measurement of a temperature through use of a temperature sensor. Further, it is assumed that the temporarily energized unit 42 being a control circuit is used for the execution operation. Moreover, it is assumed that, in the first association information, the energization control switch 32 is associated with an execution operation ID for measuring a temperature. In this case, the first control unit 52 executes the fourth identification of identifying the energization control switch 32.

Then, the first control unit 52 excludes the energization control switch ID identified in the fourth identification, from the energization control switch IDs identified in the third specification. An energization control switch specified by the energization control switch ID after this exclusion is an energization control switch identified in the processing in Step S106.

In the above-mentioned example, the elimination it to eliminate the energization control switch ID of the energization control switch 32 identified in the second identification, from the energization control switch IDs of the energization control switches 31 and 32 identified in the first identification. The energization control switch ID of the energization control switch 31 is the energization control switch ID identified in the processing in Step S106.

Then, in processing of Step S107, the first control unit 52 turns off the energization control switch that is identified in the processing in Step S106.

Subsequently, in processing of Step S108, the first control unit 52 determines whether to terminate the processing in FIG. 4. The first control unit 52 executes the determination by determining whether termination information is input from the outside, for example.

When a determination result acquired in the processing in Step S108 is yes, the first control unit 52 terminates the processing illustrated in FIG. 4. Meanwhile, when the determination result acquired in the processing in Step S108 is no, the first control unit 52 repeats the processing in Step S105.

[Effects]

In the undersea device according to the first example embodiment, the temporarily energized unit, which is a portion to be energized during use and not to be energized otherwise, is energized only when the predetermined functional operation is performed. Thus, the undersea device can reduce an operating time of the temporarily energized unit. Therefore, the undersea device can suppress occurrence of a defect caused by an operation of the temporarily energized unit. For that reason, the undersea device can suppress occurrence of a defect.

Second Example Embodiment

In the undersea device according to the first example embodiment, power consumption of the undersea device is increased due to a current consumed in the temporarily energized unit during energization. In this case, when the current consumed in the temporarily energized unit is large, a current flowing through the Zener diode that converts the system current to the primary voltage is reduced, and the breakdown voltage cannot be maintained, which may lead to reduction of the primary voltage in some cases. The present example embodiment is an example embodiment relating to an undersea device capable of suppressing reduction of a primary voltage when such reduction is caused by energization of a temporarily energized unit.

[Configuration and Operation]

FIG. 5 is a conceptual diagram illustrating a configuration of a undersea device 100 being an example of the undersea device according to the second example embodiment.

The undersea device 100 illustrated in FIG. 5 is different from the undersea device 100 illustrated in FIG. 1 in the following manner. Description is made mainly on a difference between the undersea device 100 illustrated in FIG. 5 and the undersea device 100 illustrated in in FIG. 1.

In addition to the configurations included in the undersea device 100 illustrated in FIG. 1, the undersea device 100 illustrated in FIG. 5 includes voltage control switches 21 to 2n being n switches. The processing unit 51 illustrated in FIG. 5 is connected to a control line group 72 including control lines connected to the voltage control switches.

Each of the voltage control switches is connected to each of the Zener diodes 11 to 1n in parallel. Each of the switches is turned on or off, based on a signal applied through each of the control lines in the control line group 72. For example, each of the switches is a field effect transistor.

The processing unit 51 controls on/off of each of the voltage control switches. Under the control, the processing unit 51 adjusts a voltage level of a primary voltage V1 applied between the terminal 91 and the terminal 92. Herein, it is assumed that a breakdown voltage of each of the Zener diodes is a voltage Vsr. In this case, the primary voltage V1 is q×Vsr. Herein, q is the number of voltage control switches to be turned off, and is an integer from 1 to n. Therefore, the processing unit 51 can adjust the primary voltage V1 being an input voltage of a voltage supply unit 86, according to the number of switches to be turned off.

The voltage control switches are not necessarily needed to be connected to all the Zener diodes in parallel. The voltage control switches may be connected only to some of the Zener diodes in parallel.

At an initial state, the processing unit 51 performs control in such a way as to turn some voltage control switches on and turn the other voltage control switches off. This is for making room for suppressing reduction of the primary voltage V1, which may be caused when the temporarily energized unit is energized, by turning off the voltage control switch that is in an on state.

When the energization control switch is turned on in order to energize a temporarily energized unit that is not yet energized, the processing unit 51 identifies a voltage control switch to be turned from an on state to an off state. Herein, it is assumed that the processing unit 51 holds second association information in advance. The second association information is association information that associates a voltage control switch ID being identification information for a voltage control switch and an energization switch ID with each other. This association is established between a voltage control switch that is turned off in order to compensate a voltage drop of the primary voltage V1 caused when an energization control switch is turned on and an energization control switch ID of the energization control switch. The processing unit 51 executes the identification, based on the second association information.

Further, the processing unit 51 turns the identified voltage control switch off, and increases the primary voltage V1. With this, the processing unit 51 suppresses reduction of the primary voltage V1 caused by energization to the temporarily energized unit.

FIG. 6 is a conceptual diagram illustrating a configuration example of the processing unit 51 illustrated in FIG. 5. The processing unit 51 illustrated in FIG. 6 includes a second control unit 55, in addition to the configuration included in the processing unit 51 illustrated in FIG. 2. The second control unit 55 is connected to the voltage control switches via the control lines in the control line group 72.

When an energization control switch to be turned on is identified in the processing in Step S102 illustrated in FIG. 3, the first control unit 52 stores an energization control switch ID of the energization control switch in an energization control switch ID storage unit 533 of a storage unit 53.

When an energization control switch to be turned off is identified in the processing in Step S105 illustrated in FIG. 3, the first control unit 52 deletes an energization control switch ID of the energization control switch from the energization control switch ID storage unit 533.

The second control unit 55 monitors the energization control switch ID storage unit 533. Then, it is assumed that the second control unit 55 determines that a new energization control switch ID is stored in the energization control switch ID storage unit 533. In this case, the second control unit 55 identifies a voltage control switch ID associated with the energization control switch ID that is newly stored, based on the above-mentioned second association information stored in a second association information storage unit 534.

Then, the second control unit 55 turns off the identified voltage control switch.

Meanwhile, it is assumed that the second control unit 55 determines that an energization control switch ID is deleted from the energization control switch ID storage unit 533. In this case, the second control unit 55 identifies a voltage control switch associated with the energization control switch ID that is eliminated, based on the second association information stored in the second association information storage unit 534.

Further, the second control unit 55 turns the identified voltage control switch on. With this, the second control unit 55 suppresses increase in the primary voltage V1 caused by turning off an energization control switch and stopping energization to an associated temporarily energized unit.

FIG. 7 is a conceptual diagram illustrating a processing flow example of processing of turning the voltage control switch off, which is executed by the second control unit 55 illustrated in FIG. 6. For example, the second control unit 55 starts the processing illustrated in FIG. 7 when activation of the processing unit 51 is completed.

First, as processing in Step S201, the second control unit 55 determines whether a new energization control switch ID is stored in the energization control switch ID storage unit 533 in FIG. 6.

When a determination result acquired in the processing in Step S201 is yes, the second control unit 55 executes processing in Step S202. Meanwhile, when the determination result acquired in the processing in Step S201 is no, the second control unit 55 repeats the processing in Step S201, and waits for a new energization control switch ID to be stored in the energization control switch ID storage unit 533.

When executing the processing in Step S202, the second control unit 55 identifies, as the processing in S202, a voltage control switch to be turned off. The second control unit 55 executes this identification by identifying a voltage control switch ID associated with the energization control switch ID that is determined in the processing in Step S201 to be newly stored, based on the above-mentioned second association information.

Subsequently, as processing in Step S203, the second control unit 55 turns off the voltage control switch identified in the processing in Step S202.

Then, as processing in Step S204, the second control unit 55 determines whether to terminate the processing in FIG. 7. For example, the second control unit 55 executes the determination by determining whether termination information is input from the outside.

When a determination result acquired in the processing in Step S204 is yes, the second control unit 55 terminates the processing illustrated in FIG. 7. Meanwhile, when the determination result acquired in the processing in Step S204 is no, the second control unit 55 repeats the processing in Step S201.

In parallel with the processing illustrated in FIG. 7, the second control unit 55 executes processing illustrated in FIG. 8. FIG. 8 is a conceptual diagram illustrating a processing flow example of processing of turning a voltage control switch on, which is executed by the second control unit 55 illustrated in FIG. 6. For example, the second control unit 55 starts the processing illustrated in FIG. 8 when activation of the processing unit 51 is completed.

First, as processing in Step S205, the second control unit 55 determines whether an energization control switch ID is newly deleted from the energization control switch ID storage unit 533.

When a determination result acquired in the processing in Step S205 is yes, the second control unit 55 executes processing in Step S206. Meanwhile, when the determination result acquired in the processing in Step S205 is no, the second control unit 55 repeats the processing in Step S205.

When executing the processing in Step S206, the second control unit 55 identifies a voltage control switch to be turned on. When executing the identification, first, the second control unit 55 identifies a voltage control switch to be turned on, which is associated with the energization control switch ID determined in the processing in Step S205 to be newly eliminated, based on the second association information stored in the second association information storage unit 534.

Subsequently, as processing in Step S207, the second control unit 55 turns on the voltage control switch identified in the processing in Step S206.

Then, as processing in Step S208, the second control unit 55 determines whether to terminate the processing in FIG. 8. For example, the second control unit 55 executes the determination by determining whether termination information is input from the outside.

When a determination result acquired in the processing in Step S208 is yes, the second control unit 55 terminates the processing illustrated in FIG. 8. Meanwhile, when the determination result acquired in the processing in Step S208 is no, the second control unit 55 repeats the processing in Step S205.

[Effects]

The undersea device according to the second example embodiment includes the configuration included in the undersea device according to the first example embodiment, and in the first place, exerts similar effects to those in the undersea device according to the first example embodiment.

In addition, when the temporarily energized unit is energized, the undersea device according to the second example embodiment increases the number of Zener diodes connected in series on the input side for setting an input voltage. When the energization is stopped, the number of Zener diodes is reduced. With this, the undersea device can suppress reduction in the input voltage caused by energization to the temporarily energized unit, and can suppress increase in the input voltage caused by cancellation of the energization.

FIG. 9 is a conceptual diagram illustrating a configuration of an undersea device 100x being a minimum configuration of the undersea device according to the example embodiments. The undersea device 100x is a device used in an undersea cable system. The undersea device 100x includes an energization switching unit 3x and one or more temporarily energized units 4x.

The temporarily energized unit 4x is a portion to be temporarily energized during use. The energization switching unit 3x supplies power to at least one temporarily energized unit 4x when a predetermined operation is executed, and terminates supply of power to at least one temporarily energized unit 4x when the operation is completed.

The undersea device 100x supplies power to the temporarily energized unit 4x only during use, and thus an operating time of the temporarily energized unit 4x is reduced. With the reduction, occurrence of a defect caused by an operation of the temporarily energized unit 4x can be suppressed. For that reason, the undersea device 100x can suppress occurrence of a defect.

Therefore, the undersea device 100x exerts the effects described in the section of [Advantageous Effects of Invention], based on the configuration described above.

Each of the example embodiments of the present invention are described above, but the present invention is not limited to the above-mentioned example embodiments, and modification, replacement, and adjustment may be made without departing from the basic technical idea of the present invention. For example, configurations of elements illustrated in the drawings are merely examples for easy understanding of the present invention, and the present invention is not limited to those configurations illustrated in the drawings.

Note that a part or an entirety of each of the example embodiments described above may be described as in the following supplementary notes, however, is not limited thereto.

(Supplementary Note 1)

An undersea device being used in an undersea cable system, the undersea device including:
  one or more temporarily energized units being a temporarily energized portion during use; and
  an energization switching unit that supplies power to at least one of the temporarily energized units when a predetermined operation is executed and that terminates supply of power to at least one of the temporarily energized units when the operation is completed.

(Supplementary Note 2)

The undersea device according to supplementary note 1, wherein
  the energization switching unit is an energization control switch.

(Supplementary Note 3)

The undersea device according to supplementary note 1 or 2, further including
  a first control unit that causes the energization switching unit to execute the supply and the supply termination.

(Supplementary Note 4)

The undersea device according to any one of supplementary notes 1 to 3, further including
  a voltage setting unit between an input power supply line for receiving a current from a power supply source being a land device, and an output power supply line for transmitting the current to another device, the voltage setting unit setting a supply voltage, based on the current flowing between the input power supply line and the output power supply line.

(Supplementary Note 5)

The undersea device according to supplementary note 4, wherein the voltage setting unit executes a suppression operation for suppressing reduction of the supply voltage due to the supply when the supply is executed.

(Supplementary Note 6)

The undersea device according to supplementary note 5, wherein
the voltage setting unit executes suppression operation cancellation for the suppression operation when the supply termination is executed.

(Supplementary Note 7)

The undersea device according to any one of supplementary notes 4 to 6, wherein
the voltage setting unit includes a plurality of Zener diodes being connected in series in a direction opposite to the current.

(Supplementary Note 8)

The undersea device according to supplementary note 7, wherein
each of at least some Zener diodes among the plurality of Zener diodes is connected to a short circuit switching unit that executes short-circuiting of both terminals of the each diode or cancelling the short-circuiting, and
the short circuit switching unit that is predetermined to execute the short-circuiting executes the cancellation of the short-circuiting when the operation is executed, and executes the short-circuiting upon the completion.

(Supplementary Note 9)

The undersea device according to supplementary note 8, wherein
the short circuit switching unit is a short circuit switching switch.

(Supplementary Note 10)

The undersea device according to supplementary note 8 or 9, further including
a second processing unit that causes the short circuit switching unit to execute the short-circuiting and the cancellation of the short-circuiting.

(Supplementary Note 11)

The undersea device according to any one of supplementary notes 1 to 10, further including
a constantly energized unit being a constantly energized portion.

(Supplementary Note 12)

The undersea device according to any one of supplementary notes 1 to 11, wherein
the undersea device is an amplification relay device that amplifies and relays an optical signal transmitted via a cable.

(Supplementary Note 13)

The undersea device according to any one of supplementary notes 1 to 12, wherein
the undersea device is an undersea device to be installed on a seabed.

(Supplementary Note 14)

An energization method in an undersea device for an undersea cable system, the method including:
supplying power to at least one temporarily energized unit being a temporarily energized portion during use when a predetermined operation is executed; and
terminating supply of power to at least one of the temporarily energized units when the operation is completed.

(Supplementary Note 15)

An energization program causing a computer of an undersea device for an undersea cable system to execute:
supply of power to at least one temporarily energized unit being a temporarily energized portion during use when a predetermined operation is executed; and
termination of supply of power to at least one of the temporarily energized units when the operation is completed.

The undersea cable system in supplementary note 1 is, for example, an undersea cable system in which the undersea device 100 in FIG. 1 or FIG. 5 is installed. The temporarily energized unit is, for example, the temporarily energized units 41 to 4m in FIG. 1 or FIG. 5. The predetermined operation is, for example, the specific functional operation described above.

The energization control switch is, for example, the energization control switches 31 to 3m in FIG. 1 or FIG. 5. The undersea device is, for example, the undersea device 100 in FIG. 1 or FIG. 5. The energization control switch in supplementary note 2 is, for example, the energization control switches 31 to 3m in FIG. 1 or FIG. 5. The first control unit in supplementary note 3 is, for example, the first control unit 52 in FIG. 2 or FIG. 6.

The current in supplementary note 4 is, for example, the system current Is in FIG. 1 or FIG. 5. The input power supply line is, for example, the input power supply line 81 in FIG. 1 or FIG. 5. The output power supply line is, for example, the output power supply line 82 in FIG. 1 or FIG. 5. The another device is, for example, the another undersea device being a connection destination of the output power supply line 82 in FIG. 1 or FIG. 5.

The voltage setting unit in supplementary note 5 is, for example, the voltage control switches 21 to 2n in FIG. 5. The suppression operation is, for example, the operation of turning off any one of the voltage control switches 21 to 2n in an on state. The suppression operation cancellation in supplementary note 6 is, for example, the operation of turning on any one of the voltage control switches 21 to 2n in an off state.

The Zener diodes in supplementary note 7 are, for example, the Zener diodes 11 to 1n in FIG. 1 or FIG. 5. The short circuit switching unit in supplementary note 8 is, for example, the voltage control switches 21 to 2n in FIG. 5. The cancellation of the short-circuiting is, for example, the operation of turning off any one of the voltage control switches 21 to 2n in an on state.

The short circuit switching switch in supplementary note 9 is, for example, the voltage control switches 21 to 2n in FIG. 5. The second control unit in supplementary note 10 is, for example, the second control unit 55 in FIG. 6. The constantly energized unit in supplementary note 11 is, for example, the constantly energized units 61 to 6p in FIG. 1 or FIG. 5. The amplification relay device in supplementary note 12 is, for example, the undersea device 100 in FIG. 1 or FIG. 5.

The undersea device in supplementary note 13 is, for example, the undersea device 100 in FIG. 1 or FIG. 5. The undersea device in supplementary note 14 and supplementary note 15 is, for example, the undersea device 100 in FIG. 1 or FIG. 5. The computer in supplementary note 15 is, for example, the processing unit 51 in FIG. 1, FIG. 2, FIG. 5, or FIG. 6.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-230364, filed on Dec. 20, 2019, the disclosure of which is incorporated herein in its entirety by reference.

REFERENCE SIGNS LIST 100, 100x Undersea device
11, 12, 1n Zener diode
31, 32, 3m Energization control switch
3x Energization switching unit
41, 42, 4m, 4x Temporarily energized unit
51 Processing unit
52 First control unit
53 Storage unit
531 Execution operation ID storage unit
532 First association information storage unit
533 Energization control switch ID storage unit
534 Second association information storage unit
54 Operation processing unit
61, 62, 6p Constantly energized unit
71, 72 Control line group
86 Voltage supply unit
91, 92 Terminal

What is claimed is:

1. An undersea device being used in an undersea cable system, the undersea device comprising:
   one or more temporarily energizer being a temporarily energized portion during use;
   one or more memories storing instructions;
   one or more processors configured to execute the instructions to:
      detect a specific functional operation is executed, the specific functional operation being set in advance as an operation using the temporarily energizer;
      detect the specific functional operation is completed; and
   an energization switch configured to supply power to at least one of the temporarily energizer when the one or more processors determine that the specific functional operation is executed and terminate supply of power to at least one of the temporarily energizer when the one or more processors determine that the specific functional operation is completed; and
   a voltage setter between an input power supply line configured to receive a current from a power supply source being a land device, and an output power supply line configured to transmit the current to another device, the voltage setter configured to set a supply voltage, based on the current flowing between the input power supply line and the output power supply line,
   wherein the voltage setter executes a suppression operation for suppressing reduction of the supply voltage due to the supply when the supply is executed.

2. The undersea device according to claim 1, wherein the energization switch is an energization control switch.

3. The undersea device according to claim 1, further comprising
   a first controller configured to cause the energization switch to execute the supply and the supply termination.

4. The undersea device according to claim 1, wherein the voltage setter executes suppression operation cancellation for the suppression operation when the supply termination is executed.

5. The undersea device according to claim 1, wherein the voltage setter includes a plurality of Zener diodes being connected in series in a direction opposite to the current.

6. The undersea device according to claim 5, wherein each of at least some Zener diodes among the plurality of Zener diodes is connected to a short circuit switch configured to execute short-circuiting of both terminals of the each diode or cancelling the short-circuiting, and the short circuit switch that is predetermined to execute the short-circuiting executes the cancellation of the short-circuiting when the operation is executed, and executes the short-circuiting upon the completion.

7. The undersea device according to claim 6, wherein the short circuit switch is a short circuit switching switch.

8. The undersea device according to claim 6, further comprising
   a second processor configured to cause the short circuit switch to execute the short-circuiting and the cancellation of the short-circuiting.

9. The undersea device according to claim 1, further comprising
   constantly energizer being a constantly energized portion.

10. The undersea device according to claim 1, wherein the undersea device is an amplification relay device configured to amplify and relay an optical signal transmitted via a cable.

11. The undersea device according to claim 1, wherein the undersea device is an undersea device to be installed on a seabed.

12. An energization method in an undersea device for an undersea cable system, the method comprising:
    detecting a specific functional operation is executed, the specific functional operation being set in advance as an operation using the temporarily energizer;
    detecting the specific functional operation is completed;
    supplying power to at least one temporarily energized means being a temporarily energized portion during use when determining that the specific functional operation is executed;
    terminating supply of power to at least one of the temporarily energized means when determining that the specific functional operation is completed;
    setting a supply voltage by a voltage setter between an input power supply line configured to receive a current from a power supply source being a land device, and an output power supply line configured to transmit the current to another device, the voltage setter setting the supply voltage based on the current flowing between the input power supply line and the output power supply line; and
    executing, by the voltage setter, a suppression operation for suppressing reduction of the supply voltage due to the supply when the supply is executed.

13. A non-transitory recording medium recording an energization program causing a computer of an undersea device for an undersea cable system to execute:
    detecting a specific functional operation is executed, the specific functional operation being set in advance as an operation using the temporarily energizer;
    detecting the specific functional operation is completed;
    supply of power to at least one temporarily energizer being a temporarily energized portion during use when determining that the specific functional operation is executed;

termination of supply of power to at least one of the temporarily energizer when determining that the specific functional operation is completed;

setting a supply voltage by a voltage setter between an input power supply line configured to receive a current from a power supply source being a land device, and an output power supply line configured to transmit the current to another device, the voltage setter setting the supply voltage based on the current flowing between the input power supply line and the output power supply line; and executing, by the voltage setter, a suppression operation for suppressing reduction of the supply voltage due to the supply when the supply is executed.

* * * * *